(12) United States Patent
Aoyama et al.

(10) Patent No.: US 9,752,477 B2
(45) Date of Patent: Sep. 5, 2017

(54) HONEYCOMB STRUCTURE

(71) Applicant: NGK Insulators, Ltd., Nagoya (JP)

(72) Inventors: Tomokatsu Aoyama, Nagoya (JP);
Masataka Yamashita, Nagoya (JP);
Michio Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 261 days.

(21) Appl. No.: 14/618,196

(22) Filed: Feb. 10, 2015

(65) Prior Publication Data
US 2015/0240678 A1 Aug. 27, 2015

(30) Foreign Application Priority Data

Feb. 25, 2014 (JP) .................. 2014-033618

(51) Int. Cl.
B01D 46/24 (2006.01)
C04B 38/00 (2006.01)
F01N 3/022 (2006.01)
B32B 3/12 (2006.01)

(52) U.S. Cl.
CPC ......... F01N 3/0222 (2013.01); B01D 46/244 (2013.01); B01D 46/247 (2013.01); B01D 46/2459 (2013.01); B32B 3/12 (2013.01); C04B 38/0012 (2013.01); B01D 2046/2481 (2013.01); B01D 2046/2492 (2013.01);
(Continued)

(58) Field of Classification Search
None
See application file for complete search history.

(56) References Cited

U.S. PATENT DOCUMENTS

2005/0138908 A1 6/2005 Kasai et al.
2005/0210848 A1 9/2005 Kuki et al.
(Continued)

FOREIGN PATENT DOCUMENTS

EP 1 541 215 A1 6/2005
EP 2 090 351 A2 8/2009
(Continued)

OTHER PUBLICATIONS

Extended European Search Report (Application No. 15156413.5) dated Nov. 4, 2015.
(Continued)

Primary Examiner — David Sample
Assistant Examiner — Nicholas W Jordan
(74) Attorney, Agent, or Firm — Burr & Brown, PLLC

(57) ABSTRACT

A honeycomb structure including a honeycomb structure body, first plugging portions, and second plugging portions. The honeycomb structure body has a porous partition wall. The first plugging portions are disposed at an outflow side end face of inlet cells and an inflow side end face of outlet cells. The inlet cells are the predetermined cells of the honeycomb structure body. The outlet cells are the residual cells of the honeycomb structure body. The second plugging portions are not fired. The first plugging portions form a checkered pattern at the inflow side end face and the outflow side end face. The number of the second plugging portions is within 3% of the number of cell open ends where the first plugging portions are not formed, on both end faces of the honeycomb structure body.

8 Claims, 4 Drawing Sheets

● INCOMPLETE CELL 3e
▲ FIRST COMPLETE CELL 3f
■ SECOND COMPLETE CELL 3g
* THIRD COMPLETE CELL 3h
+ FOURTH COMPLETE CELL 3i

(52) U.S. Cl.
    CPC ...... *F01N 2330/06* (2013.01); *F01N 2330/30* (2013.01); *Y02T 10/20* (2013.01); *Y10T 428/24157* (2015.01)

(56) References Cited

U.S. PATENT DOCUMENTS

| | | | |
|---|---|---|---|
| 2006/0208382 A1* | 9/2006 | Shirai | C04B 35/195 264/78 |
| 2007/0059485 A1 | 3/2007 | Mizutani | |
| 2007/0231535 A1 | 10/2007 | Mizutani | |
| 2009/0202402 A1 | 8/2009 | Sato | |
| 2012/0168995 A1 | 7/2012 | Sato | |
| 2012/0247088 A1* | 10/2012 | Beall | F01N 3/033 60/274 |

FOREIGN PATENT DOCUMENTS

| | | |
|---|---|---|
| JP | 2005-270755 A1 | 10/2005 |
| JP | 2007-075733 A | 3/2007 |
| JP | 2007-260595 A | 10/2007 |
| JP | 2010-247145 A | 11/2010 |

OTHER PUBLICATIONS

Japanese Office Action, Japanese Application No. 2014-033618, dated May 16, 2017 (3 pages).

* cited by examiner

● INCOMPLETE CELL 3e
▲ FIRST COMPLETE CELL 3f
■ SECOND COMPLETE CELL 3g
* THIRD COMPLETE CELL 3h
+ FOURTH COMPLETE CELL 3i

HONEYCOMB STRUCTURE

The present application is an application based on JP2014-033618 filed on Feb. 25, 2014 with the Japanese Patent Office, the entire contents of which are incorporated herein by reference.

BACKGROUND OF THE INVENTION

Field of the Invention

The present invention relates to a honeycomb structure that can be used as a filter for purifying exhaust gas.

Gas exhausted from internal combustion engines such as diesel engines, various combustion devices, or a similar device contains a large amount of particulate matter (PM) having soot as a main component. Since the PM directly released into the atmosphere causes environmental pollution, a filter (for example, a diesel particulate filter (DPF)) for trapping the PM is mounted at an exhaust system of exhaust gas.

For example, a plugged honeycomb structure having a porous partition wall and plugging portions has been used as such filter. The partition wall defines a plurality of cells that forms channels for fluid (exhaust gas and purified gas). The plugging portions plug open ends of the cells. The plugging portions are disposed at open ends of predetermined cells (inflow cells) at an outflow side end face of the fluid (purified gas) and open ends of residual cells (outflow cells) at an end face on an inflow side of the fluid (exhaust gas).

In the plugged honeycomb structure, when flowing exhaust gas from the inflow cells, PM in the exhaust gas is trapped to the partition wall while the exhaust gas passes through the partition wall. Then, purified gas from which the PM is removed flows out from the outflow cells.

To use a particulate matter trapping filter, such as a DPF, continuously over a long period of time, the filter needs to be regenerated regularly. That is, to reduce the pressure loss increased by the PM deposited inside the filter over time to return the filter performance to the initial state, the PM deposited inside the filter is burned with high-temperature gas and removed. The pressure loss value of the filter is monitored and the exhaust gas temperature is increased by increasing fuel injection so that the PM is removed.

The interval of the regeneration processes of the filter (time until the regeneration process is required to be performed) is preferably longer in order to reduce fuel consumption. However, the pressure loss values of the filters differ depending on the respective filters. Accordingly, it is necessary to set the pressure loss value (control value) in the filter regeneration process taking into account the fluctuation of the pressure loss in manufacturing the filters. The larger the fluctuation of the pressure loss values of the respective individuals of filters, the interval for the regeneration process should be short. However, this leads to an increase in the fuel consumption. Besides, due to recent tightened regulations on fuel consumption and $CO_2$, more severe accuracy has been required for pressure loss performance than in the conventional filters. Accordingly, adjusting the pressure loss of the honeycomb structure during manufacture is necessary.

Patent Document 1 discloses a honeycomb structure which includes second plugging portions which are not fired and remains unfired.

[Patent Document 1] JP-A-2005-270755

SUMMARY OF THE INVENTION

However, Patent Document 1 is dedicated to preventing PM from being disproportionally deposited in the filter. The honeycomb structure of Patent Document 1 includes the second plugging portions at open ends of cells at least at the outermost circumference of either one of the open ends or all outer circumference cells positioning at a predetermined number of cells in an internal direction from the outermost circumference. Accordingly, the honeycomb structure is not suitable for finely adjusting the pressure loss. This also has a problem of reducing an ash deposition allowable capacity of the honeycomb structure.

The object of the present invention is to provide a honeycomb structure that has pressure loss performance at required severe accuracy and allows improving productivity.

The inventors have found that forming a second plugging portion and restricting the number of second plugging portions allows solving the problems. According to the present invention, the following honeycomb structure is provided.

According to a first aspect of the present invention, the honeycomb structure includes a honeycomb structure body, first plugging portions, and a second plugging portions. The honeycomb structure body has a porous partition wall with one end face and another end face. The partition wall defines a plurality of cells. The cells extend from an inflow side end face to an outflow side end face. The inflow side end face is the one end face while the outflow side end face is the other end face. The cells form channels for exhaust gas. The first plugging portions are disposed at the outflow side end face of inlet cells and at the inflow side end face of outlet cells. The inlet cells are predetermined cells of the honeycomb structure body. The outlet cells are residual cells of the honeycomb structure body. The first plugging portions plug the respective cells with a first plugging material which is then fired. The second plugging portions plug the cells with a second plugging material. The second plugging material contains an adhesive material and an aggregate which is not fired afterward and remains unfired. The number of the second plugging portions is within 3% of the number of cell open ends where the first plugging portions are not formed, on both end faces of the honeycomb structure body.

According to a second aspect of the present invention, the honeycomb structure according to the first as et is configured as follows. The second plugging portions are provided in a range up to the fifth complete cells from an outermost circumference of the honeycomb structure.

According to a third aspect of the present invention, the honeycomb structure according to the first aspect is configured as follows. The honeycomb structure body is formed by bonding a plurality of honeycomb segments. Each honeycomb segment includes the porous partition wall which defines the plurality of cells. The second plugging portions are provided in a range up to the third cells from the outermost circumference of the honeycomb segment.

According to a fourth aspect of the present invention, the honeycomb structure according to any one of the first to third aspects is configured as follows. A material of the second plugging portion is identical to the material of the outer circumference coating material. The outer circumference coating material coats the outer circumference of the honeycomb structure body.

According to a fifth aspect of the present invention, the honeycomb structure according to any one of the first to fourth aspects is configured as follows. The second plugging portions are provided at the inflow side end face of the honeycomb structure.

According to a sixth aspect of the present invention, the honeycomb structure according to any one of the first to fifth aspects is configured as follows. The shape of the cells of the honeycomb structure is any of a square shape, a rectangular shape, a diamond shape, and a hexagonal shape.

According to a seventh aspect of the present invention, the honeycomb structure according to the sixth aspect is configured as follows. The second plugging portions are provided at an outflow side end face of the honeycomb structure and at cells aligned on diagonal lines of the cells passing through the center of the honeycomb structure or a honeycomb segment.

According to an eighth aspect of the present invention, the honeycomb structure according to any one of the first to seventh aspects is configured as follows. The second plugging portions have a different color from the first plugging portions.

According to a ninth aspect of the present invention, the honeycomb structure according to any one of the first to eighth aspects is configured as follows. The hydraulic diameter of the cells open at the inflow side end face is larger than the hydraulic diameter of the cells open at the outflow side end face.

According to a tenth aspect of the present invention, the honeycomb structure according to any one of the first to ninth aspects is configured as follows. The honeycomb structure is made of a ceramic material of at least one kind selected from the group consisting of cordierite, alumina, mullite, aluminum titanate, silicon nitride, and silicon carbide.

Forming the second plugging portion in the honeycomb structure allows finely adjusting required accuracy of the pressure loss. Restricting the number of second plugging portions avoids significant increase in pressure loss.

DETAILED DESCRIPTION OF THE PRESENT INVENTION

The following describes embodiments of the present invention with reference to the drawings. Hereinafter, embodiments of the present invention will be described with reference to the drawings. The present invention is not limited to the following embodiments, and changes, modifications and improvements can be added to the embodiments without departing from the scope of the invention.

Figure 1:
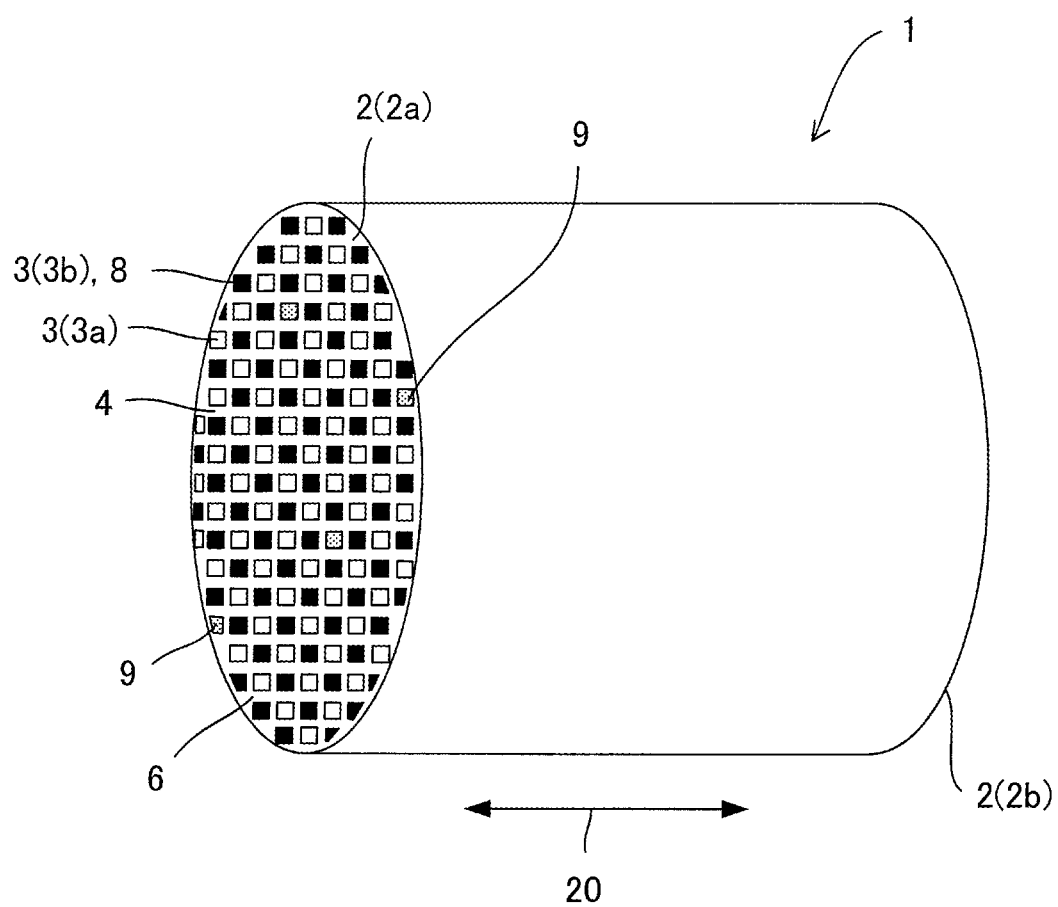
FIG. 1 is a perspective view showing one embodiment of the honeycomb structure.
Figure 2:
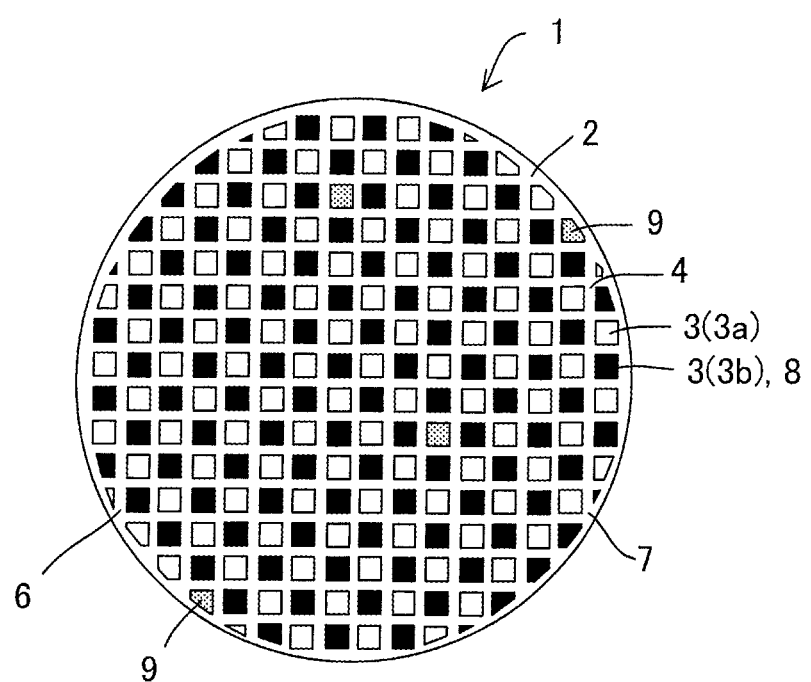
FIG. 2 is a schematic diagram showing an inflow side end face of the one embodiment of the honeycomb structure.
Figure 3:
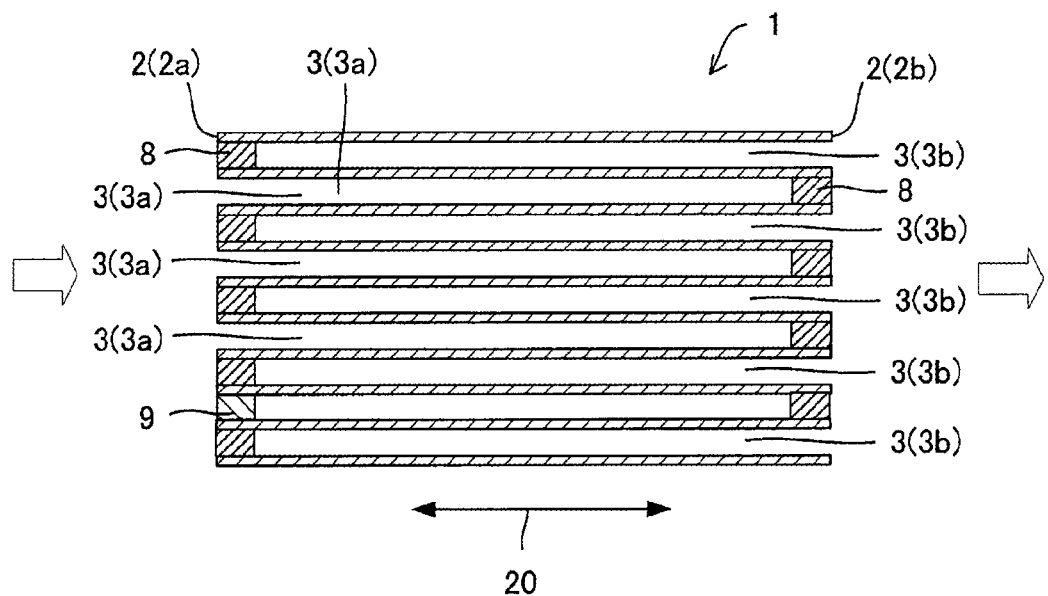
FIG. 3 is a cross-sectional view schematically showing a cross section parallel to the axial direction of the honeycomb structure.

[1] Honeycomb Structure:

[1-1] Outline:

FIG. 1 is a perspective view showing one embodiment of a honeycomb structure of the present invention. FIG. 2 is a schematic diagram showing an inflow side end face. FIG. 3 is a cross-sectional view schematically showing a cross section parallel to the axial direction (cell extending direction). The honeycomb structure 1 of the present invention includes a honeycomb structure body 6, first plugging portions 8, and second plugging portions 9. The honeycomb structure body 6 has a porous partition wall 4. Each first plugging portions 8 is disposed at an outflow side end face 2b of an inlet cell 3a or at an inflow side end face 2a of an outlet cell 3b. The inlet cells 3a are the predetermined cells 3 of the honeycomb structure body 6. The outlet cells 3b are the residual cells 3. The second plugging portions 9 are not fired.

The honeycomb structure body 6 includes the plurality of cells 3 extending from the inflow side end face 2a, which is one end face 2, to the outflow side end face 2b, which is the other end face 2. The cells 3 form channels for exhaust gas. The partition wall 4 defines the cells 3. The first plugging portions 8 plug the respective cells with a first plugging material which is then fired. The second plugging portions 9 are not fired; the second plugging portions plug the cells with a second plugging material containing the adhesive material and the aggregate, thus the second plugging portions 9 are unfired. The number of the second plugging portions 9 is within 3% (including 3%) of the number of cell open ends where the first plugging portions are not formed, on both end faces of the honeycomb structure body.

It is preferable that the first plugging portions 8 disposed at the inflow side end face 2a and the outflow side end face 2b form a so-called checkered pattern. That is, at the inflow side end face 2a, the first plugging portions 8 are formed at 50% of the cells 3. The first plugging portions are not formed at the remaining 50% of the cells 3. The same applies for the outflow side end face 2b. The second plugging portions 9 are formed at within 3% of the open ends of the cells (total of the open ends of the cells at the inflow side end face 2a and the outflow side end face 2b) where the first plugging portions 8 are not formed. It is more preferable that the second plugging portions 9 are formed at within 2% of the cell open ends. Here, 3% of the cell open ends means 3% of the cell open ends excluding the incomplete cells 3e (see FIG. 5).

Adding the second plugging portion 9 to the honeycomb structure 1 allows fine adjustment corresponding to the required accuracy of pressure loss. That is, the pressure loss of the honeycomb structure 1 can be finely adjusted into a required range. This improves the yield of the honeycomb structure 1 and reduces out-of-specification products which conventionally used to be scrapped. Restricting the number of the second plugging portions 9 allows fine adjustment of the pressure loss without significant increase in pressure loss. Furthermore, adding the second plugging portion 9 allows adjusting the pressure loss. Accordingly, the honeycomb structure 1 may be prepared so that the pressure loss is lowered in advance. This reduces scrap of the out-of-specification products in the case where the pressure loss is out of the predetermined range and thus improves the yield.

[1-2] Honeycomb Structure Body:

The honeycomb structure 1 includes a honeycomb structure body 6 that has the porous partition wall 4. The partition wall 4 defines the plurality of cells 3. The cells 3 run through from the one end face 2 to the other end face 2 and form channels for a fluid. The honeycomb structure 1 further includes a circumferential wall 7 which is disposed at an outer circumference. It is to be noted that the honeycomb structure 1 does not necessarily have the circumferential wall 7.

The shape of the cells of the honeycomb structure 1 is preferably any of a square shape, a rectangular shape, a diamond shape, and a hexagonal shape. Alternatively, the cells may have shapes which are a combination of two or more of these shapes.

It is preferable that the hydraulic diameter of the cells 3 open at the inflow side end face 2a be larger than the hydraulic diameter of the cells 3 open at the outflow side end face 2b. This constitution allows reducing an increase in pressure loss due to changes over time where the PM or the like deposits on the partition wall at the inflow side channel of the honeycomb structure 1. In this description, "hydraulic diameter of cell" is a value calculated by the formula "4×(cross-sectional area)/(circumference)." Here, the "cross-sectional area" means the area of a cell 3 at a cross section perpendicular to the cell 3 extending direction (axial direction 20). The "circumference" means a "length at the outer circumference of a cell" at a cross section perpendicular to the cell 3 extending direction.

The shape of the honeycomb structure body 6 is not specifically limited. The shape of the honeycomb structure body 6 is preferably a pillar shape, a pillar shape with oval bottom surface, a pillar shape with polygonal bottom surface, such as a quadrangular shape, a pentagonal shape, and a hexagonal shape, or a similar shape. The shape of the honeycomb structure body 6 is further preferably the pillar shape. The size (for example, the length) of the honeycomb structure body 6 (honeycomb structure 1) is not specifically limited. The honeycomb structure body 6 preferably has a length of 50 to 500 mm in the cell 3 extending direction. For example, in the case where the outer shape of the honeycomb structure body 6 (honeycomb structure 1) is a pillar shape, the diameter of the bottom surface is preferably 50 to 800 mm.

The partition wall 4 and the circumferential wall 7 are preferably mainly made of ceramic. The material of the partition wall 4 and the circumferential wall 7, for example, are preferably at least one kind selected from the group consisting of the following. That is, the material is preferably at least one kind selected from the group consisting of cordierite, alumina, mullite, aluminum titanate, silicon nitride, and silicon carbide. Among them, cordierite is further preferable. The use of cordierite allows obtaining a honeycomb structure 1 having small thermal expansion coefficient and excellent thermal shock resistance. The material of the partition wall 4 and the circumferential wall 7 are preferably the same. It is to be noted that the material of the partition wall 4 and the circumferential wall 7 may differ. "Mainly made of ceramic" means that ceramic is contained at 90 mass % or more of the all constituents.

The porosity of the partition wall 4 is preferably 25 to 80%, further preferably 35 to 75%, and especially preferably 40 to 70%. The porosity of the partition wall 4 within the range allows maintaining mechanical strength as a structure while reducing the pressure loss. The porosity of the partition wall 4 is a value measured by a mercury porosimeter.

The thickness of the partition wall 4 is preferably 0.05 to 0.60 mm, further preferably 0.10 to 0.45 mm, and especially preferably 0.15 to 0.40 mm. The partition wall 4 at a thickness of less than 0.05 mm possibly causes insufficient mechanical strength as a structure. The thickness of more than 0.60 mm is likely to increase the pressure loss. The thickness of the partition wall 4 is a value measured by a method of observing a cross section perpendicular to the central axis with a microscope.

The average pore diameter of the partition wall 4 is preferably 3 to 50 µm, further preferably 5 to 40 µm, and especially preferably 7 to 30 µm. The average pore diameter of the partition wall 4 of less than 3 µm is likely to increase the pressure loss. The average pore diameter of more than 50 µm is likely to reduce trapping efficiency. The average pore diameter of the partition wall 4 is a value measured by a mercury porosimeter.

The cell density of the honeycomb structure body 6 is preferably 7.75 to 93.00 cells/cm$^2$, further preferably 15.50 to 77.50 cells/cm$^2$, and especially preferably 23.25 to 62.00 cells/cm$^2$. The cell density of the honeycomb structure body 6 of less than 7.75 cells/cm$^2$ is likely to fail to obtain sufficient area for the honeycomb structure body 6 in contact with the exhaust gas. The cell density of more than 93.00 cells/cm$^2$ is likely to increase the pressure loss. The cell density is the number of cells 3 per unit area at a cross section perpendicular to the cell 3 extending direction.

The aperture ratio of the cells 3 (aperture ratio when the first plugging portion 8 and the second plugging portion 9 are not formed) is preferably 30 to 90%, further preferably 40 to 90%, and especially preferably 50 to 90%. The aperture ratio of the cells 3 of less than 30% is likely to increase the pressure loss. The aperture ratio of more than 90% is likely to fail to obtain sufficient strength of the honeycomb structure body 6. The aperture ratio of the cells 3 is an aperture ratio of the cells 3 at the respective one end face 2 and other end face 2 of the honeycomb structure body 6. The aperture ratio of the cells 3 at the one end face 2 and the aperture ratio of the cells 3 at the other end face 2 may be the same or may differ.

The thickness of the circumferential wall 7 is not specifically limited. The thickness of the circumferential wall 7 is preferably 0.025 to 6.000 mm, further preferably 0.050 to 4.500 mm, and especially preferably 0.100 to 3.000 mm. The thickness of the circumferential wall 7 of 0.025 mm or more allows maintaining the mechanical strength of the circumferential wall 7. The thickness of more than 6.000 mm is likely to increase the pressure loss. The honeycomb structure 1 does not necessarily have the circumferential wall 7.

Figure 4A:
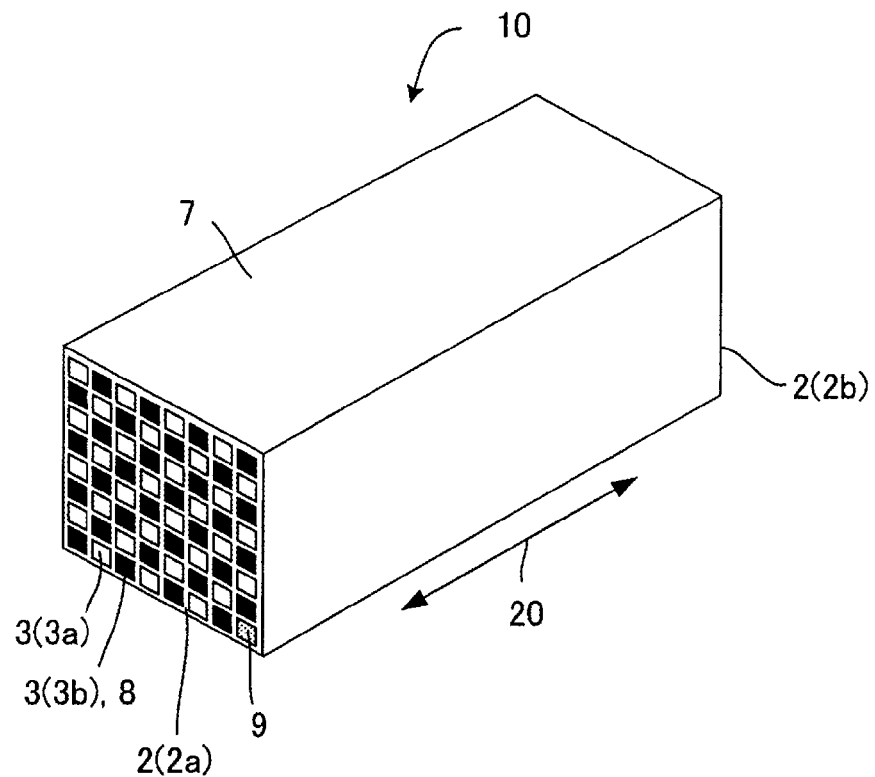
FIG. 4A is a perspective view showing one embodiment of the honeycomb segment.
Figure 4B:
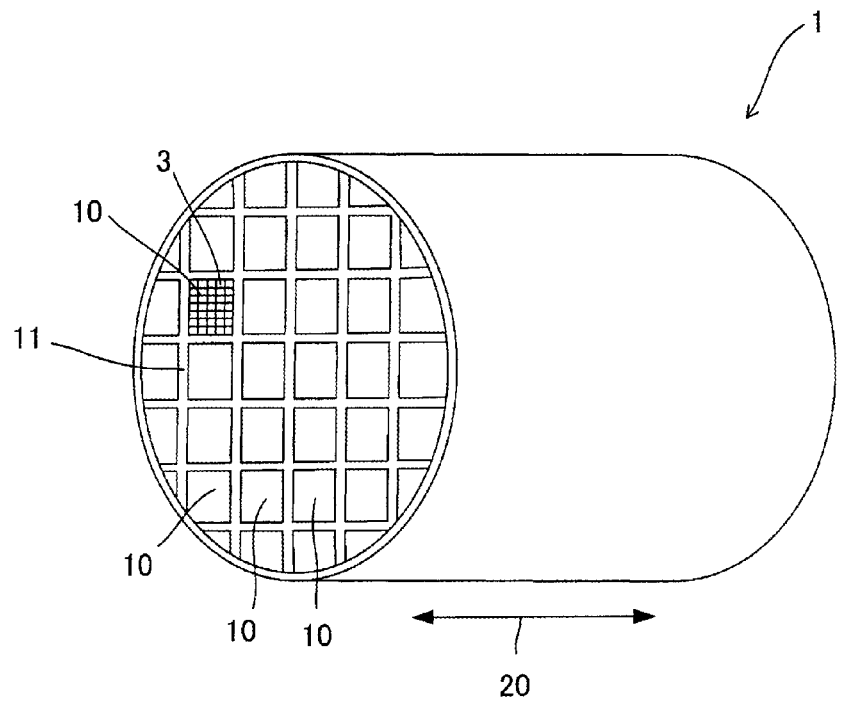
FIG. 4B is a perspective view showing one embodiment of the segment-bonded type honeycomb structure.

The honeycomb structure body 6 may be constituted by bonding the plurality of honeycomb segments 10 shown in FIG. 4A. The plurality of honeycomb segments 10 are disposed such that the side surfaces are adjacently opposed to one another and bonded with a bonding material. Thus, a segment-bonded type honeycomb structure shown in FIG. 4B is formed.

[1-3] Plugging Portions:

[1-3-1] First Plugging Portions:

FIG. 3 is a cross-sectional view showing a cross section parallel to the axial direction 20 (cell extending direction) of the honeycomb structure 1. The first plugging portions 8 are disposed at the outflow side end face 2b of the inlet cells 3a and the inflow side end face 2a of the outlet cells 3b. The inlet cells 3a are the predetermined cells 3 of the honeycomb structure body 6. The outlet cells 3b are the residual cells 3. The inlet cells 3a and the outlet cells 3b are alternately formed. At the inflow side end face 2a, the first plugging portions 8 are formed into a checkered pattern. At the outflow side end face 2b, the first plugging portions 8 are also formed into a checkered pattern. The first plugging portions 8 plug the cells with a first plugging material which is then fired.

As the material of the first plugging portion 8, the material same as the material of the partition wall 4 can be used. Using the same material as the material of the partition wall 4 is preferable.

[1-3-2] Second Plugging Portions:

The second plugging portions 9 are disposed at the cells 3 where the first plugging portions 8 are not disposed. Accordingly, the second plugging portions 9 are disposed at the inflow side end face 2a of the inlet cells 3a and at the outflow side end face 2b of the outlet cells 3b. The number of the second plugging portions 9 is within 3% of the cell open ends where the first plugging portions 8 are not formed, on both end faces 2a and 2b of the cells 3. By setting the number of the second plugging portions 9 within 3%, the pressure loss can be adjusted to be a desired value without too much decreasing the open area proportion of the inlet cells, that is, ash deposition allowable capacity. A negative effect to, for example, an engine output can also be prevented. Furthermore, isostatic strength can be increased, allowing reducing a crack at end faces.

The second plugging portions 9 are not fired after the second plugging material containing an adhesive material and an aggregate is filled to the respective cells; thus the second plugging portions 9 are unfired. The second plugging portions 9 are provided to the honeycomb structure body 6 which is previously fired in order to form the first plugging portions 8. The honeycomb structure body 6 provided with the first plugging portions 8 is subjected to measurement of its pressure loss. The second plugging portions 9 are additionally provided to increase the low pressure loss of the honeycomb structure body 6 provided with the first plugging portions 8. The second plugging portions 9 are not fired after the second plugging material is disposed. In view of this, the second plugging material contains the adhesive material and the aggregate. By containing the adhesive material there is no need for performing a firing process. Thus, a production cost can be reduced. The second plugging portions may be dried after the second plugging material is disposed.

As the adhesive material for the second plugging material, colloid oxide is preferable. Preferable examples of the colloid oxide are, for example, silica sol and alumina sol. The aggregates for the second plugging material are preferably at least one kind of material selected from the group consisting of silicon carbide, alumina, a particulate cordierite (burned powder), and alumina silicate fiber.

It is also a preferable embodiment that the material of the second plugging portion 9 be the same material as the outer circumference coating material, which coats the outer circumference of the honeycomb structure body 6. Thus, by designing the material of the second plugging portion 9 to the same material as the outer circumference coating, no new material needs to be prepared, ensuring reducing the production cost.

It is preferable that the second plugging portions 9 be provided in a range up to the fifth complete cells from the outermost circumference of the honeycomb structure 1. Limiting the second plugging portions 9 in the range up to the fifth cells from the outer circumference allows enhancing the strength of the honeycomb structure 1.

Figure 5:
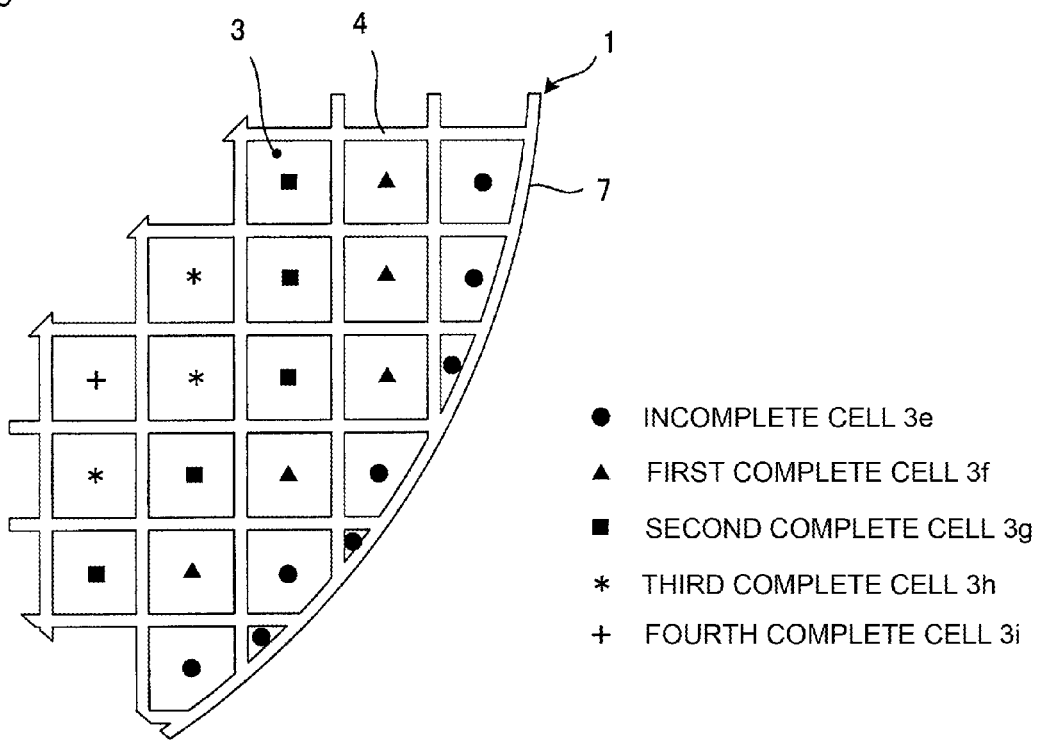
FIG. 5 is an explanatory view for describing how to count the number of cells from an outermost circumference of the honeycomb structure.

The following describes how to count the cells 3 provided with the second plugging portions 9 by referring to FIG. 5. Like in FIG. 5, in the case where the cross section perpendicular to the axial direction 20 of the honeycomb structure 1 has a shape such as a circle, some of the cells 3 have a shape shaped along the outer circumference shape of the honeycomb structure 1. Such cells 3 are referred to as incomplete cells 3e. The incomplete cells 3e are shown with black circles in FIG. 5.

In FIG. 5, first complete cells 3f from the outermost circumference toward the center of the honeycomb structure 1 are shown with black triangles. The first complete cells 3f and the outermost circumference may sandwich some incomplete cells 3e. Unlikely to this, at a first complete cell 3f, an apex of a polygon constituting the cross section of the first complete cell 3f may just coincide the circumferential wall 7. In this case, the first complete cells 3f and the circumferential wall 7 do not sandwich any incomplete cell 3e between them.

The complete cells adjacent to the first complete cells 3f separated by the partition wall 4 are second complete cells 3g. Furthermore, the third or later complete cells are also similarly specified. FIG. 5 shows the third complete cells 3h with asterisks and fourth complete cells 3i with positive signs.

When specifying the cells 3 as described above, "the second plugging portions 9 be provided in a range up to the fifth complete cells from the outermost circumference of the honeycomb structure 1" means that the incomplete cells 3e and the complete cells up to the fifth complete cells may be provided with the second plugging portions 9. The second plugging portions 9 may be provided in the incomplete cells 3e. However, such second plugging portions hardly affect the pressure loss since it is the incomplete cells 3e at the outermost circumstance that are plugged. Accordingly, such incomplete cells 3e are not counted as the number of the second plugging portions 9. The number of the second plugging portions 9 is 3% of the number of the cell open ends excluding the incomplete cells 3e.

In the case where the honeycomb structure body 6 is formed by bonding a plurality of honeycomb segments 10 (see FIG. 4A), which have porous partition walls 4 defining the plurality of cells 3, providing second plugging portions 9 in a range up to the third cell from the outermost circumference of the honeycomb segment 10 is preferable. Limiting the second plugging portions 9 in the range up to the third cells from the outer circumference allows enhancing the strength of the honeycomb structure 1.

Providing the second plugging portions 9 at the inflow side end face 2a of the honeycomb structure 1 is preferable. In particular, in the case where the second plugging portions 9 are provided in the range up to the third cells from the outermost circumference of the honeycomb segment 10, providing the second plugging portions 9 at the inflow side end face 2a is preferable. This constitution allows reducing deposition of soot at the outer circumference portion where soot is comparatively less likely to be regenerated compared with the center of the honeycomb segment 10. This is effective to reduce ember of the soot.

The second plugging portion 9 can also be provided at the outflow side end face 2b of the honeycomb structure 1. This can increase the strength as the structure. Accordingly, this is effective to improve soot regeneration limit (crack resistance properties) against thermal stress generated at the outflow side of the honeycomb structure 1 during soot regeneration. When disposing the second plugging portions 9 at the outflow side end face 2b of the honeycomb structure 1, it is preferable to provide the second plugging portions 9 at the cells 3 aligned on diagonal lines of the cells passing through the center of the honeycomb structure 1 or the honeycomb segment 10. In the case of bonding bodies of the honeycomb segments 10, they are the cells 3 aligned on the diagonal lines of the cells passing through the center of each of the honeycomb segments 10. This constitution allows enhancing the strength of the honeycomb structure 1.

The second plugging portions 9 preferably have a different color from the first plugging portions 8. This constitution facilitates identification of the inflow side and the outflow side of the honeycomb structure 1. It is only necessary that the color difference can be easily identified by visual check. For example, a colored powder or the like is added to the second plugging material such that the second plugging material may have a different color from the first plugging material.

[2] Method for Manufacturing Honeycomb Structure:

[2-1] Integrated Honeycomb Structure:

The following describes a method for manufacturing the honeycomb structure 1 of the embodiment. First, a kneaded material for fabricating the honeycomb structure 1 is prepared. This kneaded material is formed to fabricate a honeycomb formed body (forming process). The obtained honeycomb formed body is preferably dried to obtain a dried honeycomb body.

Next, the obtained honeycomb formed body (or the dried honeycomb body after the drying performed as necessary) is fired to fabricate the honeycomb structure 1 (honeycomb structure fabrication process).

Next, in the obtained honeycomb structure 1 open ends of the predetermined cells 3 (outlet cells 3b) at the inflow side end face 2a and open ends of the residual cells 3 (inlet cells 3a) at the outflow side end face 2b are plugged to form the plugging portion (plugging process). The plugging process includes a first plugging process and a second plugging process. The second plugging process is for adjusting the pressure loss.

Thus, the honeycomb structure 1 of the embodiment can be manufactured. The following further describes the respective manufacturing processes in detail.

[2-1-1] Forming Process:

First, in the molding process, a ceramic forming raw material containing a ceramic raw material is integrally molded. Thus, a honeycomb formed body that defines the plurality of cells 3, which become the channels for a fluid, is formed. Here, "integrally molded" means that the honeycomb structure body 6 is extruded as a monolithic body. Even the case where outer circumference grinding and outer circumference coating are performed, if the honeycomb formed body is not formed by the bonding bodies of the honeycomb segments 10, the honeycomb formed body is considered to be integrally molded.

The ceramic raw material contained in the ceramic forming raw material is, for example, silicon carbide (SiC), silicon-silicon carbide-based composite material, silicon nitride, a cordierite forming raw material, cordierite, mullite, alumina, aluminum titanate, titania, silicon carbide, and aluminum titanate. It is preferable that the ceramic raw material be at least one kind selected from the group consisting of silicon carbide (SiC), silicon-silicon carbide-based composite material, cordierite raw material, cordierite, mullite, alumina, aluminum titanate, titania, silicon carbide, and aluminum titanate. The "silicon-silicon carbide-based composite material" is formed by using silicon carbide (SiC) as aggregates and silicon (Si) as a binding material. The "cordierite forming raw material" is a ceramic raw material where materials are combined so as to meet a chemical composition within a range of silica: 42 to 56 mass %, alumina: 30 to 45 mass %, and magnesia: 12 to 16 mass %. The cordierite forming raw material becomes cordierite by being fired.

This ceramic forming raw material is preferably prepared by mixing a dispersing medium, an organic binder, an inorganic binder, a pore former, surfactant, and the like to the ceramic raw material. The composition ratio of the respective raw materials is not especially limited. The composition ratio is preferably set according to the structure, the material, and the like of the honeycomb structure body 6 to be fabricated.

When forming the ceramic forming raw material, the following is preferable. First, the forming raw material is kneaded to form a kneaded material. The obtained kneaded material is molded into a honeycomb shape. A method for forming the kneaded material by kneading the molding raw material is not especially limited. For example, a method of using a kneader, a vacuum pugmill, or the like is applicable. The method for forming the honeycomb formed body by molding the kneaded material is not especially limited. The conventionally-known molding methods, such as an extrusion and an injection molding, are applicable. For example, a method such as extruding the kneaded material with a die having a desired cell shape, a partition wall thickness, and a cell density is preferable for forming the honeycomb formed body. As the material of the die, cemented carbide, which is less likely to wear, is preferable.

After the forming, the obtained honeycomb formed body may be dried. The drying method is not especially limited. The drying method can include, for example, hot-air drying, microwave drying, dielectric drying, reduced-pressure drying, vacuum drying, and freeze-drying. Especially, it is preferable to perform the drying by any one of or in combination of the dielectric drying, the microwave drying, and the hot-air drying.

[2-1-2] Honeycomb Structure Fabrication Process:

Next, the obtained honeycomb formed body is fired to obtain the honeycomb structure 1. The honeycomb formed body may be fired after disposing the first plugging portions in the honeycomb formed body.

It is preferable to calcine the honeycomb formed body before firing the honeycomb formed body. The calcination is performed for degreasing. The method is not especially limited. It is only necessary to remove the internal organics (organic binder, dispersing agent, pore former, and the like). Generally, the combustion temperature of organic binder is around 100 to 300° C. and the combustion temperature of pore former is around 200 to 800° C. Accordingly, as a condition for calcination, the honeycomb formed body is preferably heated at around 200 to 1000° C. for around 3 to 100 hours in an oxidizing atmosphere.

The honeycomb formed body is fired to sinter the forming raw material which constitutes the calcinated molded body, to densify the honeycomb formed body and ensure a predetermined strength. The firing conditions (temperature, time, and atmosphere) depend on the kind of the forming raw material. Accordingly, it is only necessary to select appropriate conditions according to the forming raw material. For example, in the case of cordierite forming raw material, the firing temperature is preferably 1410 to 1440° C. The firing time as period for keeping the honeycomb formed body at the maximum temperature, is preferably four to six hours.

[2-1-3] Plugging Process:

Next, the plugging materials are filled at the ends of the inlet cells 3a on the outflow side end face 2b side and the ends of the residual outlet cells 3b on the inflow side end face 2a side of the honeycomb structure 1. Thus, the first plugging portions 8 are formed (first plugging process).

When filling the plugging material to the honeycomb structure 1, for example, first, the plugging material is filled to the end of the cells on the inflow side end face 2a side. Afterwards, the plugging material is filled to the end of the cells on the outflow side end face 2b side. As a method for filling the plugging material to the ends, a method including a following masking process and a press-fitting process is applicable. The masking process pastes a sheet to the one end face (for example, the inflow side end face 2a) of the honeycomb structure 1. Then, the sheet is perforated at positions corresponding to the cells where the "plugging portions are to be formed." The press-fitting process press-fits "the end of the honeycomb structure body on the side where the sheet is pasted" into a container where the plugging material is accumulated. Then, the plugging material is press-fitted into the cells 3 of the honeycomb structure 1. When press-fitting the plugging material into the cells 3 of the honeycomb structure 1, the plugging material passes through the holes formed at the sheet and the plugging material is filled to the cells communicating with the holes formed in the sheet.

Next, the plugging materials filled in the honeycomb structure 1 are dried to form the first plugging portion 8. After filling the plugging materials to both ends of the honeycomb structure 1, the plugging material may be dried. Alternatively, after drying the plugging material filled to the one end of the honeycomb structure 1, the plugging material may be filled to the other end and then, the plugging materials filled to the other end may be dried. Further, in order to steady the plugging material with more certainty, the honeycomb structure 1 may be fired. Alternatively, the plugging material may be filled to the honeycomb formed body before drying or the honeycomb formed body after drying (dried honeycomb body). Then, the plugging material may be fired together with the honeycomb formed body before drying or the dried honeycomb body.

The outer circumference portion of the honeycomb formed body can also be ground to form the honeycomb formed body into a desired shape. Further, after grinding the outer circumference portion, an outer circumference coating material may be disposed at the outer circumference portion. Thus, the honeycomb structure 1 can be fabricated. This outer circumference coating material forms the circumferential wall 7 of the honeycomb structure 1. Disposing this circumferential wall 7 has an advantage, such as improvement of roundness of the honeycomb structure 1. Grinding the outer circumference portion and coating the outer circumference are optional and may be performed as necessary.

The pressure loss of the honeycomb structure 1 where the first plugging portions 8 are formed is measured. Then, the second plugging portions 9 are formed so as to attain the desired pressure loss (second plugging process). To form the second plugging portion 9, the second plugging material containing the adhesive material and the aggregates are prepared. Some and not all of the open cells where the first plugging portion 8 is not formed are plugged with the second plugging material. Since the second plugging material contains the adhesive material, the second plugging portions need not to be fired after the plugging. After the plugging with the second plugging material, the second plugging portions may be dried. The honeycomb structure 1 with desired pressure loss (see FIG. 1) can be fabricated by the above-described processes.

[2-2] Segment-Bonded Type Honeycomb Structure:

In the case where the honeycomb structure 1 to be fabricated is formed by bonding the plurality of honeycomb segments 10, the honeycomb segments 10 are fabricated by the method similar to the above-described method for the honeycomb structure 1. Then, the first plugging portions 8 are formed at the ends of cells 3 of the honeycomb segments 10 (see FIG. 4A. Note that FIG. 4A also shows the second plugging portions 9).

Next, the obtained respective honeycomb segments 10 are bonded with the bonding material such that the side surfaces of the plurality of honeycomb segments 10 are adjacently opposed to one another. In such a way a bonded body of the honeycomb segments 10 having the opposed side surfaces bonded with bonding layers 11 is fabricated.

The honeycomb segments 10 are preferably bonded with the bonding material. The method for applying the bonding material to the side surfaces of the honeycomb segments 10 is not especially limited. A method such as application using a brush or the like is applicable.

As the bonding material, for example, a slurry formed by adding additives, such as an organic binder, foamable resin, and a dispersing agent, to an inorganic raw material, such as an inorganic fiber, colloidal silica, a clay, and SiC particles; further adding water; and then kneading can be used.

The bonding material bonding the side surfaces of the honeycomb segments 10 becomes the bonding layer 11 in the honeycomb structure 1 to be fabricated.

It is preferable that after bonding the plurality of honeycomb segments 10 with the bonding materials, the outer circumference part of the obtained bonded body of the honeycomb segments 10 is ground into a desired shape. It is also preferable that after bonding the honeycomb segments 10 and grinding the outer circumference part of the bonded body, the outer circumference coating material is disposed onto the ground outer circumference part to fabricate the honeycomb structure 1. This outer circumference coating material becomes the circumferential wall 7 of the honeycomb structure 1. Disposing the circumferential wall 7 has an advantage, such as improvement of roundness of the honeycomb structure 1.

Similarly to the case of integrated honeycomb structure 1, the pressure loss of the honeycomb structure 1 where the first plugging portions 8 are formed is measured. Then, the second plugging portions 9 are formed so as to attain the desired pressure loss. The honeycomb structure 1 with desired pressure loss (see FIG. 4B) can be fabricated by the above-described processes.

EXAMPLES

Hereinafter, the present invention will specifically be described based on examples, but the present invention is not limited to these examples.

Integrated Honeycomb Structure

Examples 1 to 9

As the cordierite forming raw material, alumina, aluminum hydroxide, kaolin, talc, and silica were used. To 100 parts by mass of the cordierite raw material, 10 parts by mass of a pore former, 20 parts by mass of a dispersant medium, 1 part by mass of an organic binder, and 0.5 part by mass of a dispersing agent were added. Then, the material was mixed and kneaded, thus preparing a kneaded material. Water was used as the dispersing medium. As the pore former, coke having an average particle diameter of 15 μm was used. As the organic binder, hydroxypropylmethyl cellulose was used. As the dispersing agent, ethylene glycol was used.

Next, the kneaded material was extruded with a predetermined die. Thus, a honeycomb formed body which has the partition wall 4 defining the plurality of cells 3 running through from the one end face to the other end face was fabricated. The honeycomb formed body had the cells 3 whose shape at the cross section perpendicular to the cell 3 extending direction was a quadrangular shape, and an overall shape was a pillar shape. Next, the fabricated honeycomb formed body was dried with a microwave dryer. Further, the honeycomb formed body was completely dried with a hot-air drier. Thus, a dried honeycomb formed body (dried honeycomb body) was obtained. Afterwards, both ends of the dried honeycomb body were cut off to trim the dried honeycomb body to the predetermined dimensions.

The first plugging portions 8 were formed in the dried honeycomb formed body. First, the open ends of the cells 3 on the inflow side end face 2a side of the honeycomb formed body were masked. At this time, the masked cells 3 and the cells 3 which were not masked were alternately arranged. Then, the end of the honeycomb formed body on the side where masking was performed was dipped into a plugging slurry. Thus, the plugging slurry was filled into the open ends of the cells 3 that were not masked. Then, the remaining cells 3 at the outflow side end face 2b of the dried honeycomb formed body (that is, the cells 3 where the plugging portions were not formed at the inflow side end face 2a) were also similarly processed to form the first plugging portions 8.

Then, the honeycomb formed body where the first plugging portions 8 were formed were degreased and fired. Thus, the honeycomb formed body where the first plugging portions 8 were disposed at the open ends of the cells 3 was obtained. Conditions for the degreasing were three hours at 550° C. Conditions for firing were two hours at 1450° C. under argon atmosphere.

The obtained honeycomb structure 1 had a diameter of 144 mm and a length in the axial direction 20 was 203 mm. The value (L/D) which is the ratio of length L in the axial direction 20 to diameter D of the honeycomb structure 1 was 1.41. The cell density of the honeycomb structure 1 was 46.50 cells/cm$^2$. The thickness of the partition wall 4 was 0.30 mm. The porosity of the partition wall 4 was 50%. The average pore diameter of the partition wall 4 was 15 μm. The plugging depth of the first plugging portions 8 was 5 mm.

The second plugging portions 9 were formed at the honeycomb structure 1. Table 1 shows positions of the formed second plugging portions 9 and the number of the second plugging portions 9. The plugging depth of the second plugging portions 9 was 5 mm.

[Pressure Loss]

Air was allowed to flow into the exhaust gas purifying filter at a flow rate of 10 Nm$^3$/minute at 25° C. Air pressure was measured at the inflow end and the outflow end of the exhaust gas purifying filter. A value obtained by subtracting pressure at the outflow end from pressure at the inflow end was regarded as pressure loss.

[Isostatic Strength]

The isostatic strength was measured based on the isostatic fracture strength test specified by M505-87, automobile standard issued by Society of Automotive Engineers of Japan, Inc. (JASO standard). The isostatic fracture strength test includes putting the honeycomb structure 1 into a rubber, tubular-shaped container, lidding the container with an aluminum plate and then performing isotropic pressure compression under water. That is, the isostatic fracture strength test is a test that imitates a compressive load application in the case where the honeycomb structure 1 is grasped by the outer circumference surface in a can body. The isostatic strength measured by the isostatic fracture strength test is indicated by the applied pressure value (MPa) when the honeycomb structure 1 has broken.

[Crack Formation Test During Regeneration of Soot]

Using a four-cylinder diesel engine of 2.0 L, 6 g/L of soot discharged from the diesel engine was trapped in the honeycomb structure 1. Then, the honeycomb structure 1 was mounted in a pipe of an exhaust gas treatment system. Afterwards, the engine speed was set to 2000 rpm, and the engine torque to 60 Nm so that fuel injection was performed such that the exhaust gas temperature was 620° C. at 90 seconds after the fuel injection 20 mm in front of the inlet end face of the honeycomb structure 1. At the time point of the exhaust gas temperature reached 620° C., the engine was controlled to an idling state at the engine speed of 790 rpm and the engine torque of 10 Nm. Thus, the soot trapped in the honeycomb structure 1 was burned. After the combustion test, damage to the honeycomb structure 1 due to combustion regeneration was observed with a stereomicroscope. Thus, presence/absence of crack at the end face on the outlet side of the honeycomb structure 1 was checked. In the case where no crack was generated at the end face, the amount of soot preliminarily trapped at the honeycomb structure 1 was gradually increased by 1 g/L (for example, the amount of soot trapped in the second test was 7 g/L). The soot combustion test was repeatedly conducted until the crack was generated at the end face of the honeycomb structure 1 with the gradually increased amount of soot preliminarily trapped. In the test where the crack was generated at the end face, the highest temperature value of the honeycomb structure 1 measured during the test 15 mm in front of the outlet end face inside of the honeycomb structure 1 at the radial center of the honeycomb structure 1 (in the case of a segment structure, the center of the respective segments) was regarded as the "Maximum temperature of honeycomb structure when crack generated at end face". The temperature was measured using a K type thermocouple having a diameter of 0.5 mm.

Comparative Examples 1 to 3

Similarly to Example 1, the honeycomb structure 1 was fabricated and similar tests were conducted. However, no second plugging portion was provided in Comparative Example 1.

(Results)

For determination 1 in Table 1, pressure loss within +3% (including 3%) with respect to Comparative Example 1 was determined as Good; and pressure loss exceeding +3% was determined as Poor. This is because exceeding the pressure loss of 3% adversely affects the engine output, for example. The pressure loss of within 3% is sufficient to finely adjust the fluctuation of pressure loss among the respective products in manufacturing. For determination 2, open area proportion of inflow cells of within −3% (including −3%) with respect to Comparative Example 1 was determined as Good; and open area proportion of inflow cells of below −3% was determined as Poor. If the open area proportion of inflow cells falls below −3%, the pressure loss when ash deposits on the honeycomb structure is significantly increased. For determination 3, isostatic strength of within ±5% (including ±5%) with respect to Comparative Example 1 was determined as Good; and isostatic strength exceeding +5% was determined as Excellent. If the isostatic strength exceeds +5%, it can be said that the isostatic strength has notably improved. For determination 4, maximum temperature of honeycomb structure when crack generated at end face of within ±50° C. (including ±50° C.) with respect to Comparative Example 1 was determined as Good; and maximum temperature exceeding +50° C. was determined as Excellent. If the temperature exceeds +50° C., it can be said that the soot regeneration limit (crack resistance properties) has clearly been improved.

plugging portions, the pressure loss became too large. Comparative Example 3 had the large number of second plugging portions and the second plugging portions were disproportioned to the inlet side. Accordingly, the opening area proportion of inflow cells became small; therefore, the ash deposition allowable capacity was decreased.

TABLE 1

| Samples | Partition wall thickness [mm] | Cell density [Cells/cm²] | Number of second plugging portions | | Portions of second plugging portions | Number of cells from outermost circumference [Cell] | Pressure loss | | Determination 1 |
|---|---|---|---|---|---|---|---|---|---|
| | | | Inlet [Piece] | Outlet [Piece] | Ratio to open Ends [%] | | [kPa] | Ratio to reference [%] | |
| Example 1 | 0.30 | 46.50 | 5 | 5 | 0.3% | 15 | 3.64 | 100.3% | Good |
| Example 2 | 0.30 | 46.50 | 35 | 35 | 1.8% | 15 | 3.67 | 101.1% | Good |
| Example 3 | 0.30 | 46.50 | 55 | 55 | 2.9% | 15 | 3.71 | 102.2% | Good |
| Example 4 | 0.30 | 46.50 | 55 | 55 | 2.9% | 1 | 3.70 | 101.9% | Good |
| Example 5 | 0.30 | 46.50 | 55 | 55 | 2.9% | 5 | 3.70 | 101.9% | Good |
| Example 6 | 0.30 | 46.50 | 55 | 55 | 2.9% | 6 | 3.70 | 101.9% | Good |
| Example 7 | 0.30 | 46.50 | 110 | 0 | 2.9% | 5 | 3.71 | 102.2% | Good |
| Example 8 | 0.30 | 46.50 | 0 | 110 | 2.9% | 15 | 3.71 | 102.2% | Good |
| Example 9 | 0.30 | 46.50 | 0 | 110 | 2.9% | 5 | 3.70 | 101.9% | Good |
| Comparative Example 1 (reference) | 0.30 | 46.50 | 0 | 0 | 0.0% | — | 3.63 | 100.0% | — |
| Comparative Example 2 | 0.30 | 46.50 | 75 | 75 | 4.0% | 15 | 3.75 | 103.3% | Poor |
| Comparative Example 3 | 0.30 | 46.50 | 120 | 0 | 3.2% | 10 | 3.72 | 102.5% | Good |

| Samples | Open area proportion of inflow cells (Ash deposition allowable capacity) | | Isostatic strength | | Determination 3 | Maximum temperature of honeycomb structure when crack generated at end face [° C.] | Determination 4 |
|---|---|---|---|---|---|---|---|
| | [%] | Ratio to reference [%] | Determination 2 | [MPa] | Ratio to reference [%] | | | |
| Example 1 | 31.4 | 99.9% | Good | 6.49 | 100% | Good | 1121 | Good |
| Example 2 | 31.1 | 99.0% | Good | 6.52 | 100% | Good | 1123 | Good |
| Example 3 | 30.9 | 98.4% | Good | 6.54 | 101% | Good | 1125 | Good |
| Example 4 | 30.9 | 98.4% | Good | 7.22 | 111% | Excellent | 1178 | Excellent |
| Example 5 | 30.9 | 98.4% | Good | 7.01 | 108% | Excellent | 1174 | Excellent |
| Example 6 | 30.9 | 98.4% | Good | 6.70 | 103% | Good | 1141 | Good |
| Example 7 | 30.5 | 97.1% | Good | 7.05 | 108% | Excellent | 1121 | Good |
| Example 8 | 31.4 | 100.0% | Good | 6.54 | 101% | Good | 1132 | Good |
| Example 9 | 31.4 | 100.0% | Good | 7.02 | 108% | Excellent | 1181 | Excellent |
| Comparative Example 1 (reference) | 31.4 | 100.0% | — | 6.50 | 100% | — | 1120 | — |
| Comparative Example 2 | 30.8 | 98.1% | Good | 6.66 | 102% | Good | 1125 | Good |
| Comparative Example 3 | 30.4 | 96.8% | Poor | 6.59 | 101% | Good | 1119 | Good |

Assume that Comparative Example 1 where no second plugging portion 9 was disposed as a reference. Examples 1 to 9 where the number of second plugging portions 9 was within 3% increased the pressure loss so as to be the desired value. Additionally, the opening area proportion of inflow cells, namely, the ash deposition allowable capacity was not decreased so much, and the isostatic strength was increased. Thus, the crack at the end face was able to be reduced. Since Comparative Example 2 had the large number of second Segment-Bonded Type Honeycomb Structure Examples 10 to 18

As the ceramic raw material, the material formed by mixing silicon carbide (SiC) powder and metal silicon (Si) powder was used. As a binder, hydroxypropylmethyl cellulose and a pore former were added to the mixture and then water was further added to prepare a forming raw material.

Then, the forming raw material was kneaded with a vacuum pugmill to fabricate a kneaded material. When setting the total of the silicon carbide (SiC) powder and the metal silicon (Si) powder as 100 parts by mass, the content of the binder was 7 parts by mass. When setting the total of the silicon carbide (SiC) powder and the metal silicon (Si) powder as 100 parts by mass, the content of the pore former was 3 parts by mass. When setting the total of the silicon carbide (SiC) powder and the metal silicon (Si) powder as 100 parts by mass, the content of water was 42 parts by mass.

The obtained kneaded material was formed with an extruder. Thus, a formed body of honeycomb segment 10 with a square pillar shape was obtained. High-frequency dielectric heating drying was performed on the obtained formed body of honeycomb segment 10. Then, using a hot-air drier, the formed body was dried for two hours at 120° C.

The first plugging portions 8 were formed in the dried formed body of honeycomb segment 10.

Then, the formed body of honeycomb segment 10 where the first plugging portions 8 were formed was degreased and fired. Thus, the honeycomb segment 10 where the first plugging portions 8 were disposed at the open ends of the cells was obtained. Conditions for degreasing were three hours at 550° C. Conditions for burning were two hours at 1450° C. under argon atmosphere.

The obtained honeycomb segment 10 had a partition wall thickness of 0.30 mm and the cell density was 46.50 cells/cm². The honeycomb segment 10 had a square pillar shape with a length of 203 mm and a length of one side in a cross section of 36 mm.

16 pieces of the above-described honeycomb segments 10 were fabricated. The 16-piece honeycomb segments 10 were aligned by 4 pieces×4 pieces and were bonded with a bonding material. The bonding material was dried to obtain a bonded body of honeycomb segments 10. The bonding material was applied to the side surfaces of the honeycomb segments 10 such that the thickness of the bonding layer became 1.0 mm.

Next, the outer circumference of the bonding body of honeycomb segments 10 was ground so that the entire shape has a pillar shape.

Afterwards, a ceramic material was applied to the outer circumference of the ground bonded body of honeycomb segments 10 to form an outer circumference coating portion to obtain the honeycomb structure 1. The obtained honeycomb structure 1 had a diameter of 144 mm and a length in the axial direction 20 of 203 mm. The value (L/D) of the ratio of the length L in the axial direction 20 to the diameter D of the honeycomb structure 1 was 1.41. The cell density of the honeycomb structure 1 was 46.50 cells/cm². The thickness of the partition wall 4 was 0.30 mm. The porosity of the partition wall 4 was 50%. The average pore diameter of the partition wall 4 was 15 µm. The plugging depth of the first plugging portion 8 was 5 mm.

Next, similar to Example 1, the second plugging portions 9 were formed. The formation positions of the second plugging portions 9 and the number of the second plugging portions 9 are shown in Table 2. The plugging depth of the second plugging portion 9 was 5 mm.

Comparative Examples 4 to 6

Similarly to Example 10, the honeycomb structure 1 was fabricated and similar tests were conducted. However, the second plugging portions were not provided in Comparative Example 4.

(Results)

For determination 1 in Table 2, pressure loss of within +3% (including 3%) with respect to Comparative Example 4 was determined as Good; and pressure loss exceeding +3% was determined as Poor. For determination 2, open area proportion of inflow cells of within −3% (including −3%) with respect to Comparative Example 4 was determined as Good; and open area proportion of inflow cells falling below −3% was determined as Poor. For determination 3, isostatic strength of within 15% (including ±5%) with respect to Comparative Example 4 was determined as Good; and isostatic strength exceeding +5% was determined as Excellent. For determination 4, maximum temperature of honeycomb structure when crack generated at end face of within ±50° C. (including ±50° C.) with respect to Comparative Example 4 was determined as Good; and maximum temperature exceeding +50° C. was determined as Excellent. The reasons for criteria of the determinations are the same as the reasons described for the integrated honeycomb structure 1.

TABLE 2

| Samples | Partition wall thickness [mm] | Cell density [Cells/cm²] | Number of second plugging portions Inlet [Piece] | Number of second plugging portions Outlet [Piece] | Ratio to open ends [%] | Number of cells from outermost circumference [Cell] | Pressure loss [kPa] | Pressure loss Ratio to reference [%] | Determination 1 |
|---|---|---|---|---|---|---|---|---|---|
| Example 10 | 0.30 | 46.50 | 5 | 5 | 0.3% | 5 | 3.81 | 100.3% | Good |
| Example 11 | 0.30 | 46.50 | 35 | 35 | 1.9% | 5 | 3.85 | 101.3% | Good |
| Example 12 | 0.30 | 46.50 | 53 | 53 | 2.9% | 5 | 3.89 | 102.4% | Good |
| Example 13 | 0.30 | 46.50 | 53 | 53 | 2.9% | 1 | 3.88 | 102.1% | Good |
| Example 14 | 0.30 | 46.50 | 53 | 53 | 2.9% | 3 | 3.88 | 102.1% | Good |
| Example 15 | 0.30 | 46.50 | 53 | 53 | 2.9% | 4 | 3.88 | 102.1% | Good |
| Example 16 | 0.30 | 46.50 | 105 | 0 | 2.9% | 3 | 3.89 | 102.4% | Good |
| Example 17 | 0.30 | 46.50 | 0 | 105 | 2.9% | 5 | 3.89 | 102.4% | Good |
| Example 18 | 0.30 | 46.50 | 0 | 105 | 2.9% | 3 | 3.88 | 102.1% | Good |
| Comparative Example 4 (reference) | 0.30 | 46.50 | 0 | 0 | 0.0% | — | 3.80 | 100.0% | — |

TABLE 2-continued

| Samples | | | | | | | | | |
|---|---|---|---|---|---|---|---|---|---|
| Comparative Example 5 | 0.30 | 46.50 | 75 | 75 | 4.2% | 5 | 3.94 | 103.7% | Poor |
| Comparative Example 6 | 0.30 | 46.50 | 120 | 0 | 3.3% | 5 | 3.90 | 102.6% | Good |

| | Open area proportion of inflow cells (Ash deposition allowable capacity) | | Isostatic strength | | | Maximum temperature of honeycomb structure when crack generated at end face [° C.] | |
|---|---|---|---|---|---|---|---|
| Samples | [%] | Ratio to reference [%] | Determination 2 | [MPa] | Ratio to reference [%] | Determination 3 | | Determination 4 |
| Example 10 | 30.0 | 99.9% | Good | 8.49 | 100% | Good | 1152 | Good |
| Example 11 | 29.7 | 99.0% | Good | 8.55 | 101% | Good | 1154 | Good |
| Example 12 | 29.6 | 98.5% | Good | 8.55 | 101% | Good | 1156 | Good |
| Example 13 | 29.6 | 98.5% | Good | 9.52 | 112% | Excellent | 1206 | Excellent |
| Example 14 | 29.6 | 98.5% | Good | 9.15 | 108% | Excellent | 1203 | Excellent |
| Example 15 | 29.6 | 98.5% | Good | 8.69 | 102% | Good | 1176 | Good |
| Example 16 | 29.1 | 97.1% | Good | 9.14 | 108% | Excellent | 1152 | Good |
| Example 17 | 30.0 | 100.0% | Good | 8.67 | 102% | Good | 1170 | Good |
| Example 18 | 30.0 | 100.0% | Good | 9.22 | 108% | Excellent | 1211 | Excellent |
| Comparative Example 4 (reference) | 30.0 | 100.0% | — | 8.50 | 100% | — | 1150 | — |
| Comparative Example 5 | 29.4 | 97.9% | Good | 8.71 | 102% | Good | 1156 | Good |
| Comparative Example 6 | 29.0 | 96.7% | Poor | 8.50 | 100% | Good | 1150 | Good |

Assume that Comparative Example 4 where no second plugging portion 9 was disposed as a reference. Examples 10 to 18 where the number of second plugging portions 9 was within 3% increased the pressure loss so as to be the desired value. Additionally, the opening area proportion of inflow cells, namely, the ash deposition allowable capacity was not decreased so much, and the isostatic strength was increased. Thus, the crack at the end face was able to be reduced. Since Comparative Example 5 had a large number of second plugging portions, the pressure loss became too large. Comparative Example 6 had a large number of second plugging portions and the second plugging portions were disproportioned to the inlet side. Accordingly, the opening area proportion of inflow cells became small; therefore, the ash deposition allowable capacity was decreased.

A honeycomb structure of the present invention can be used as a filter for purifying exhaust gas.

DESCRIPTION OF REFERENCE NUMERALS

1: honeycomb structure, 2: end face, 2a: inflow side end face, 2b: outflow side end face, 3: cell, 3a: predetermined cell (inlet cell), 3b: residual cell (outlet cell), 3e: incomplete cell, 3f, 3g, 3h, 3i: complete cell, 4: partition wall, 6: honeycomb structure body, 7: circumferential wall, 8: first plugging portion, 9: second plugging portion, 10: honeycomb segment, 20: axial direction, 21: central axis.

What is claimed is:
1. A honeycomb structure comprising:
a honeycomb structure body which has a porous partition wall with one end face and another end face, the partition wall defining a plurality of cells, the cells extending from an inflow side end face to an outflow side end face, the inflow side end face being the one end face while the outflow side end face being the other end face, the cells forming channels for exhaust gas;
first plugging portions disposed at the outflow side end face of inlet cells and at the inflow side end face of outlet cells, the inlet cells being predetermined cells of the honeycomb structure body, the outlet cells being residual cells of the honeycomb structure body, the first plugging portions plugging the cells with a first plugging material which is fired; and
second plugging portions plugging the cells where the first plugging portions are not formed with a second plugging material, the second plugging material containing an adhesive material and an aggregate, which is not fired afterward and remains unfired,
wherein the number of the second plugging portions is within 3% of the number of cell open ends where the first plugging portions are not formed, on both end faces of the honeycomb structure body,
wherein the honeycomb structure body is formed by bonding a plurality of honeycomb segments, each honeycomb segment including the porous partition wall which defines the plurality of cells, and
the second plugging portions are provided in a range up to the third cell from an outermost circumference of the honeycomb segment.
2. The honeycomb structure according to claim 1, wherein a material of the second plugging portion is identical to a material of an outer circumference coating material, the outer circumference coating material coating an outer circumference of the honeycomb structure body.
3. The honeycomb structure according to claim 1, wherein the second plugging portions are provided at an inflow side end face of the honeycomb structure.
4. The honeycomb structure according to claim 1, wherein the shape of the cells of the honeycomb structure is any of a square shape, a rectangular shape, a diamond shape, and a hexagonal shape.

5. The honeycomb structure according to claim 4, wherein the second plugging portions are provided at an outflow side end face of the honeycomb structure and at cells aligned on diagonal lines of the cells passing through a center of the honeycomb structure.

6. The honeycomb structure according to claim 1, wherein the second plugging portions have a different color from the first plugging portions.

7. The honeycomb structure according to claim 1, wherein a hydraulic diameter of the cells open at an inflow side end face is larger than a hydraulic diameter of the cells open at an outflow side end face.

8. The honeycomb structure according to claim 1, wherein the honeycomb structure is made of a ceramic material of at least one kind selected from the group consisting of cordierite, alumina, mullite, aluminum titanate, silicon nitride, and silicon carbide.

* * * * *